United States Patent [19]
Chateau et al.

[11] Patent Number: 6,017,121
[45] Date of Patent: *Jan. 25, 2000

[54] MULTIFOCAL ARTIFICIAL OCULAR LENS WITH A TRANSPARENCY VARYING WITH ILLUMINATION

[75] Inventors: Nicolas Chateau, Paris; Corinne Grollier, Creteil; Dominique Baude, St. Ouen, all of France

[73] Assignee: Essilor International Compagnie Generale d'Optique, Charenton le Pont, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,206

[22] Filed: Dec. 30, 1996

[30] Foreign Application Priority Data

Dec. 29, 1995 [FR] France ................................ 95 15756

[51] Int. Cl.⁷ .............................. G02C 7/04; G02C 7/10; A61F 2/16
[52] U.S. Cl. ......................... 351/161; 351/163; 351/164; 623/6
[58] Field of Search ........................ 351/161–166; 65/30.11; 623/6

[56] References Cited

U.S. PATENT DOCUMENTS

| | | | |
|---|---|---|---|
| Re. 33,477 | 12/1990 | Loshaek | 526/313 |
| 3,507,552 | 4/1970 | Scott | 350/160 |
| 3,950,082 | 4/1976 | Volk | 351/169 |
| 4,304,895 | 12/1981 | Loshaek | 526/313 |
| 4,636,049 | 1/1987 | Blaker | 351/161 |
| 4,681,412 | 7/1987 | Lemelson | 351/162 |
| 4,851,471 | 7/1989 | Maltman | 524/719 |
| 4,913,544 | 4/1990 | Rickwood | 351/163 |
| 5,108,427 | 4/1992 | Majercik | 623/4 |
| 5,260,727 | 11/1993 | Oksman et al. | 351/161 |
| 5,757,459 | 5/1998 | Bhalakia et al. | 351/168 |

FOREIGN PATENT DOCUMENTS

| | | |
|---|---|---|
| 0227337 | 7/1987 | European Pat. Off. . |
| 0245020 | 11/1997 | European Pat. Off. . |
| 8601996 | 4/1986 | WIPO . |
| 9508135 | 3/1995 | WIPO . |

*Primary Examiner*—Georgia Epps
*Assistant Examiner*—Jordan M. Schwartz
*Attorney, Agent, or Firm*—Young & Thompson

[57] ABSTRACT

A multifocal artificial ocular lens has at least two corrective areas, namely a near vision area to correct near vision and a distance vision area to correct distance vision. The transparency of the lens varies in inverse proportion to its illumination. A photochromic substance is incorporated into the material of the lens, which improves optical performance. Applications include central near vision contact lenses.

15 Claims, 1 Drawing Sheet

MULTIFOCAL ARTIFICIAL OCULAR LENS WITH A TRANSPARENCY VARYING WITH ILLUMINATION

BACKGROUND OF THE INVENTION

1. Field of the Invention

The present invention concerns multifocal artificial ocular lenses, by which is meant both rigid material artificial ocular lenses and flexible material artificial ocular lenses.

In the present context the expression artificial ocular lenses means contact lenses, intra-ocular implants or intra-corneal lenses.

2. Description of the Prior Art

Multifocal contact lenses have at least two corrective areas, namely a near vision area adapted to correct near vision and a distance vision area adapted to correct distance vision.

One such multifocal contact lens has two concentric corrective areas, for example, disposed so that the near vision area is at the center of the lens and the distance vision area is at its periphery, in which case the lens is usually called a "central NV" lens.

Alternatively, the distance vision area is at the center and the near vision area is at the periphery, in which case the lens is usually called a "central DV" lens.

The vision performance of most multifocal contact lenses of this type is strongly dependent on the pupil diameter of the user.

The pupil of the eye exhibits a natural reflex reaction to two types of stimulation: its diameter decreases as the distance between it and the observed object is reduced and/or when the luminance of that object increases.

Variations in the pupil diameter related to the distance of the object can be exploited by appropriate multifocal optics, and in practise they are operative in the appropriate sense with central NV lenses.

With these lenses, the constriction of the pupil that accompanies near vision automatically leads to at least partial selection of the appropriate corrective area, and the same goes for the dilation of the pupil that accompanies distance vision.

In both cases the result of the reaction of the pupil to the observation distance is an improvement in the contrast in the image obtained on the retina.

On the other hand, the variations in the pupil diameter associated with the luminance of the observed object, and therefore in practise with its illumination, have undesirable effects.

With a central NV lens, for example, strong illumination results in constriction of the pupil which, by the resulting selection of the effective corrective area, favors near vision correction to the detriment of distance vision correction, even if the observed object is at a great distance.

Similarly, with a central DV lens strong illumination favors the correction of near vision to the detriment of distance vision even if the observed object is at a short distance, as may be the case for reading in a well lit place, for example.

In both cases the change from low luminance to high luminance is therefore prejudicial to the stability of visual performance, or more generally to the quality of optical performance, to the detriment of the visual comfort of the user.

A general object of the present invention is an arrangement that minimizes, if not eliminates, this drawback.

SUMMARY OF THE INVENTION

To be more precise, the present invention consists in a multifocal artificial ocular lens having at least two corrective areas, namely a near vision area adapted to correct near vision and a distance vision area adapted to correct distance vision, wherein the transparency of said lens varies in inverse proportion to its illumination.

In practise the above multifocal artificial ocular lens is made from a material having a transparency which decreases as its illumination increases.

It is a polymer or a copolymer incorporating a photochromic substance, for example.

By acting on the transparency, and therefore on the light transmission coefficient, the photochromic substance employed limits the effect of the variations in luminance or, to be more precise, it limits, if not eliminates, the reflex constriction of the pupil occasioned by high luminance.

The advantages for the user are improved visual comfort and enhanced safety.

As demonstrated by trials, an 80% variation in the light transmission coefficient between low illumination and high illumination is in practise more than sufficient to achieve the required effect.

Incorporating a photochromic substance into the material from which an eyeglass lens is made, and even into that of a contact lens, is already known in itself, of course.

However, until now, the only effect looked for has been effective and practical protection of the eye against glare.

In the case of a multifocal artificial ocular lens, the invention advantageously adds an improvement in optical performance to the above protection.

The features and advantages of the invention will emerge from the following description given by way of example with reference to the accompanying diagrammatic drawings.

DETAILED DESCRIPTION OF THE PREFERRED EMBODIMENTS

These figures show, by way of example, the is application of the invention to a multifocal contact lens 10 having, in a manner that is known in itself, at least two corrective areas, namely a near vision area $Z_{NV}$ adapted to correct near vision and a distance vision area $Z_{DV}$ adapted to correct distance vision.

Figure 1:
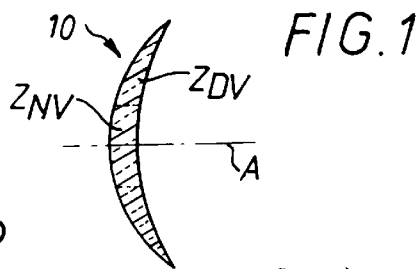
FIG. 1 is a view in axial section of a multifocal artificial ocular lens of the invention.

In the embodiment shown, only the near vision area $Z_{NV}$ and the distance vision area $Z_{DV}$ are provided in practise, and these are concentric annular areas around the optical axis A of the multifocal contact lens 10 of the invention, as shown diagrammatically in FIG. 1.

In the embodiment shown the multifocal contact lens 10 of the invention is a central NV contact lens, i.e. a contact lens in which the near vision area $Z_{NV}$ is at the center and the distance vision area $Z_{DV}$ is at the periphery.

In accordance with the invention, the transparency of this multifocal contact lens 10 varies in inverse proportion to its illumination.

To be more precise, this multifocal contact lens 10 is made from a rigid or flexible material whose transparency decreases as its illumination increases.

In practise it is a polymer or a copolymer incorporating a photochromic substance.

In accordance with the invention, this achieves an improvement in optical performance in addition to the usual protection against glare.

This improvement in optical performance will become clear from the following description with reference to the diagrams in FIGS. 2, 3, 4A, 4B, 5A and 5B.

Figure 2:
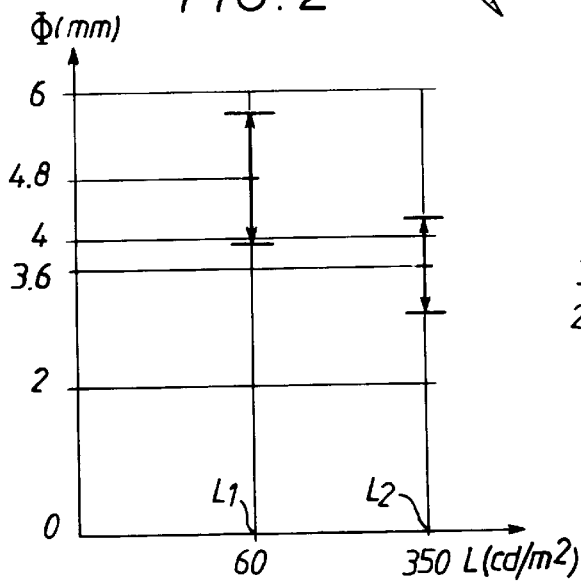
FIG. 2 is a diagram showing the effects of luminance on pupil diameter, for distance vision.
Figure 3:
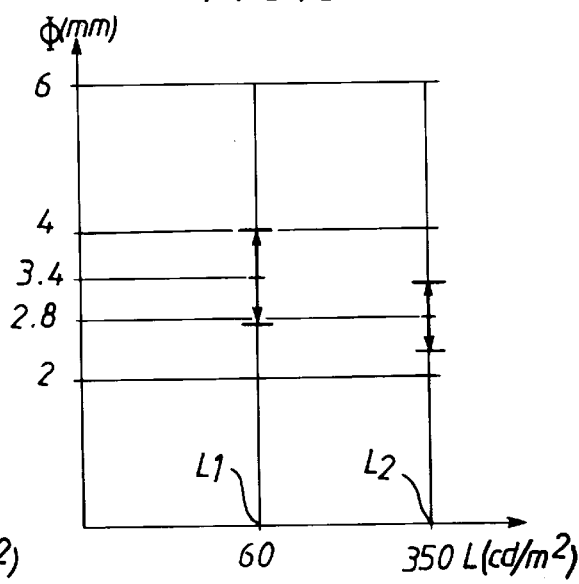
FIG. 3 is a diagram similar to that of FIG. 2 but for near vision.

In FIGS. 2 and 3, the luminance L of the observed object is plotted on the abscissa axis and the values of pupil diameter Φ measured on a group of presbyopic subjects for two given values $L_1$, $L_2$ of the luminance L are plotted on the ordinate axis.

In practise the value $L_1$ is assumed to be in the order of 60 cd/m², which is generally considered to be the minimum luminance value for comfortable reading.

The value $L_2$ is assumed to be in the order of 350 cd/m², which represents a relatively high level of illumination but one that is still bearable.

The pupil diameter values Φ were measured using a video pupil measuring device under visual conditions that were as natural as possible for the subject concerned.

For simplicity, FIGS. 2 and 3 show only the mean values and the standard deviations of the values measured for the group of presbyopic subjects tested.

For distance vision (FIG. 2) the mean pupil diameter Φ is in the order of 4.8 mm for the lower luminance value $L_1$ and in the order of 3.6 mm for the higher luminance value $L_2$.

For near vision (FIG. 3) these mean pupil diameters Φ are respectively in the order of 3.4 mm and 2.8 mm.

Note that, as predicted, the pupil diameter Φ decreases as the luminance L increases and/or as the distance to the observed object decreases.

In the diagrams of FIGS. 4A, 4B, 5A and 5B the spatial frequency F is plotted on the abscissa axis and the modulation transfer function MTF calculated for a given wavelength of 550 nm is plotted on the ordinate axis.

As is well known, the spatial frequency F represents the fineness of the details observed.

In the diagrams of FIGS. 4A, 4B, 5A and 5B it varies from 0 to 30.

Its units are those of cycles per degree.

In visual optics, a spatial frequency of six cycles per degree is usually considered to be the norm and a spatial frequency exceeding ten cycles per degree as high.

The modulation transfer function MTF constitutes a quality criterion for assessing optical performance.

It represents the capacity of the contact lens to reproduced the contrast of details of different fineness, i.e. with different spatial frequencies F.

In practise the modulation transfer function MTF takes values between 0 and 1.

Figure 4A:
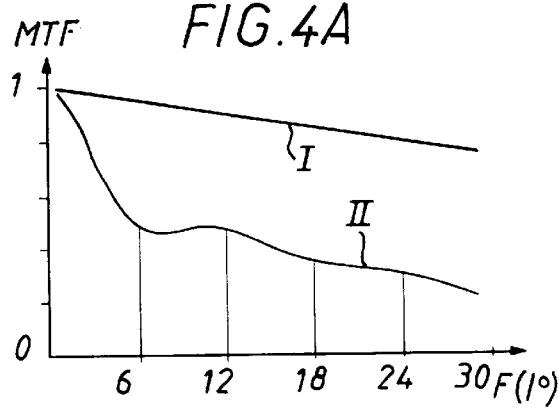
FIGS. 4A, 4B, 5A and 5B are diagrams showing the optical performance obtained with various artificial ocular lenses.
Figure 4B:
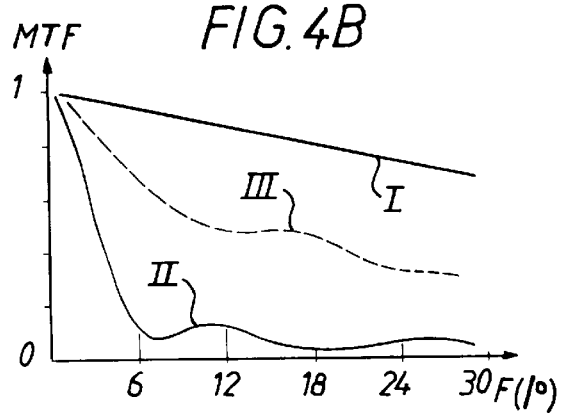

The diagrams of FIGS. 4A and 4B correspond to distance vision, the diagram of FIG. 4A for the lower luminance value $L_1$, and thus for a pupil diameter Φ in the order of 4.8 mm, and the diagram of FIG. 4B for the higher luminance value $L_2$, and therefore for a pupil diameter Φ in the order of 3.6 mm.

Figure 5A:
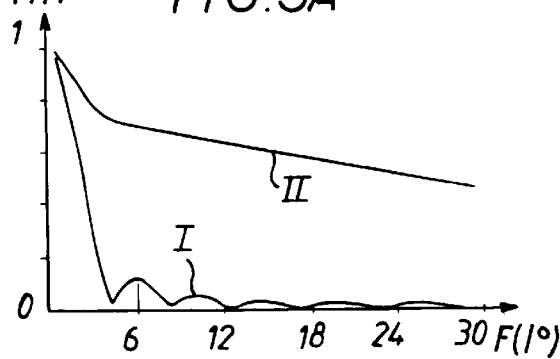
Figure 5B:
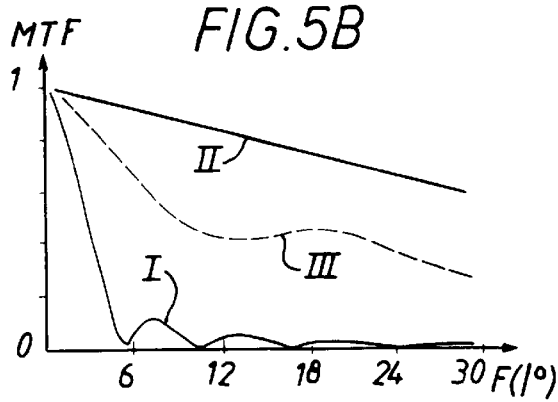

The diagrams of FIGS. 5A and 5B correspond to near vision for the same luminance values $L_1$, $L_2$.

The diagram of FIG. 5A therefore corresponds to a pupil diameter Φ in the order of 3.4 mm and that of FIG. 5B corresponds to a pupil diameter Φ in the order of 2.8 mm.

In FIGS. 4A and 4B the curves I relate to an ideal monofocal lens, i.e. a monofocal lens achieving the best possible correction of distance vision.

Note that the modulation transfer function MTF varies little and that the pupil diameter Φ has little influence, the optical performance being substantially the same for the lower luminance value $L_1$ and for the higher luminance value $L_2$.

The curves II relate to an ordinary central NV bifocal lens, the near vision area $Z_{NV}$ of which, at the center, has a diameter of 3 mm and provides an additional power of 1.5 diopters.

Note that the optical performance is substantially degraded for the higher luminance value $L_2$ (FIG. 4B) compared to that for the lower luminance value $L_1$ (FIG. 4A).

In FIGS. 5A and 5B, which correspond to near vision, the curves I relate, as previously, to an ideal monofocal lens and it will be noted that the modulation transfer function MTF then assumes very low values at medium and high spatial frequencies (five cycles per degree and above), therefore leading to very poor optical performance.

Also as previously, the curves II relate to an ordinary central NV bifocal lens and it will be noted that the influence of the pupil diameter Φ is greater than it was for near vision, optical performance being slightly degraded for the lower luminance value $L_1$ relative to that for the higher luminance value $L_2$.

However, it will also be noted that optical performance for near vision is improved compared to the ideal monofocal lens, both for the lower luminance value $L_1$ and for the higher luminance value $L_2$.

For the lower luminance value $L_1$ (FIGS. 4A and 5A), the optical performance of the ordinary bifocal lens remains substantially the same for distance vision (FIG. 4A) and for near vision (FIG. 5A).

There is therefore, in this case, a beneficial balance between optical performance for distance vision and for near vision.

This does not apply for the higher luminance value $L_2$, for which there is no such balance (FIGS. 4B and 5B).

Although optical performance remains good for near vision (FIG. 5B), it is degraded for distance vision (FIG. 4B).

In FIGS. 4B and 5B the curves III show the optical performance obtained with a multifocal lens 10 of the invention, i.e. with a multifocal lens 10 the transparency of which varies in inverse proportion to its illumination.

In this case, there is again a beneficial balance between the optical performance for distance vision (FIG. 4B) and that for near vision (FIG. 5B).

The deterioration of performance for distance vision is avoided.

In practise, good results have been obtained with an 80% variation in the light transmission coefficient between the lower luminance value $L_1$ and the higher luminance value $L_2$.

Good results have been obtained by selecting a spiro-oxazine with the following general formula as the photochromic compound:

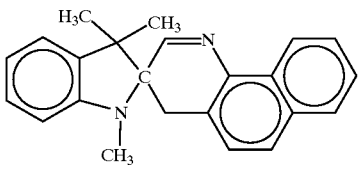

As an example, the compound may be 5-acryloxy-6'-cyano-1,3,3-trimethyl-spiro-[indoline-2,3'-[3H]-naphtho-[2,1-b]-[1,4]-oxazine] which, more precisely, has the following general formula:

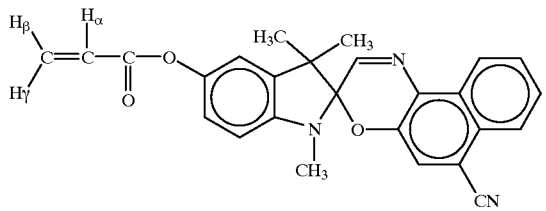

However, the compound may instead be 6'-cyano-1,3-dimethyl-3-ethyl-spiro-[indoline-2,3'-[3H]-naphtho-[2,1-b]-[1,4]-oxazine] which has the following general formula:

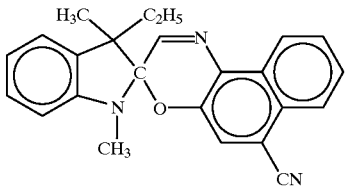

or 5-acryloxy-6'-phenylsulfonyl-1,3,3-trimethyl-spiro-[indoline-2,3'-[3H]-naphtho-[2,1-b]-[1,4]-oxazine] which has the following general formula:

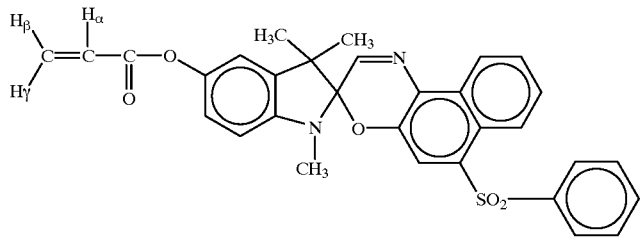

The molar proportion of the photochromic compound is advantageously in the range 0.05 mole % to 0.25 mole %.

The photochromic compound is advantageously incorporated into the mass of the polymer or copolymer constituting the constituent material of the multifocal contact lens 10.

Two possible compositions for the corresponding mixture will now be given by way of example.

The relative proportions are given with respect to the total weight of the ensemble.

Composition 1
VP=72.8%
MMA=26.1%
AM=0.23%
AIBN=0.98%
P=0.1 mole %

In this composition:
VP is vinylpyrrolidone;
MMA is methyl methacrylate;
AM is allyl methacrylate, which acts as a cross-linking agent;
AIBN is azobis-isobutyronitrile, which acts as an initiator;
P is the photochromic compound.

Composition 2
MMA=100%
DMEG=2%
AIBN=0.03%
P=0.1 mole %

In this composition, DMEG is the dimethacrylate of ethylene glycol.

The usual operating procedure is used for each of these two compositions.

Of course, the present invention is not limited to the above compositions but encompasses any composition that can produce a transparency that varies in inverse proportion to illumination.

Moreover, applications of the present invention are not limited to contact lenses, but to the contrary also encompass other artificial ocular lenses, in particular intra-ocular implants and intracorneal lenses.

There is claimed:

1. An artificial ocular lens, said artificial ocular lens being wearable on an eye or implantable in an eye, said artificial ocular lens having at least two corrective areas, namely a near vision area for correcting near vision and a distance vision area for correcting distance vision, said lens incorporating a material that has a transparency that varies inversely to received illumination to decrease the illumination received by a pupil to limit a reflexive constriction of a pupil when the pupil is exposed to light of increased luminance, the entire lens incorporating said material that has a transparency that varies.

2. The artificial ocular lens claimed in claim 1, wherein said material comprises one of a polymer and a copolymer incorporating a photochromic substance.

3. The artificial ocular lens claimed in claim 2 wherein said photochromic substance is spiro-oxazine.

4. The artificial ocular lens claimed in claim 1, wherein said lens is rigid.

5. The artificial ocular lens claimed in claim 1, wherein said lens is flexible.

6. The artificial ocular lens according to claim 1, wherein one of said near vision area and said distances vision area comprises a central area of said lens and the other of said near vision area and said distance vision area being located radially outwardly of said central area.

7. The artificial ocular lens according to claim 1, wherein said near vision area is a central area of said lens.

8. The artificial ocular lens according to claim 1, wherein said distance vision area is a central area of said lens.

9. The artificial ocular lens according to claim 1, wherein said lens has a center and a periphery, one of said vision areas being located closer to the periphery of said lens and the other of said vision areas being located closer to the center of said lens.

10. An artificial ocular lens, said artificial ocular lens being wearable on an eye or implantable in an eye, said artificial ocular lens having at least two corrective areas, namely a near vision area for correcting near vision and a distance vision area for correcting distance vision, said lens incorporating a material that has a transparency that varies inversely to received illumination to decrease the illumination received by a pupil to limit a reflexive constriction of a pupil when the pupil is exposed to light of increased luminance, said material incorporated in said lens being dispersed throughout said lens.

11. An artificial ocular lens, for wearing on an eye or implantation in an eye, said artificial ocular lens having at least two concentric corrective areas, namely a near vision area for correcting near vision and a distance vision area for correcting distance vision, said lens incorporating a material that has a transparency that varies inversely to received illumination to decrease the illumination received by a pupil to limit a reflexive constriction of a pupil when the pupil is exposed to light of increased luminance, the entire lens incorporating said material that has a transparency that varies.

12. The artificial ocular lens according to claim 1, wherein one of said near vision area and said distance vision area comprises a central area of said lens and the other of said near vision area and said distance vision area being located radially outwardly of said central area.

13. The artificial ocular lens according to claim 11, wherein said near vision area is a central area of said lens.

14. The artificial ocular lens according to 11, wherein said distance vision area is a central area of said lens.

15. An artificial ocular lens, for wearing on an eye or implantation in an eye, said artificial ocular lens having at least two concentric corrective areas, namely a near vision area for correcting near vision and a distance vision area for correcting distance vision, said lens incorporating a material that has a transparency that varies inversely to received illumination to decrease the illumination received by a pupil to limit a reflexive constriction of a pupil when the pupil is exposed to light of increased luminance, said material incorporated in said lens being dispersed throughout said lens.

* * * * *